April 13, 1926.　　　　　　　　　　　　　　　　　　1,580,301
E. JOHNSON
AIRPLANE POWDER DUSTING APPARATUS
Filed Feb. 4, 1926　　3 Sheets-Sheet 1
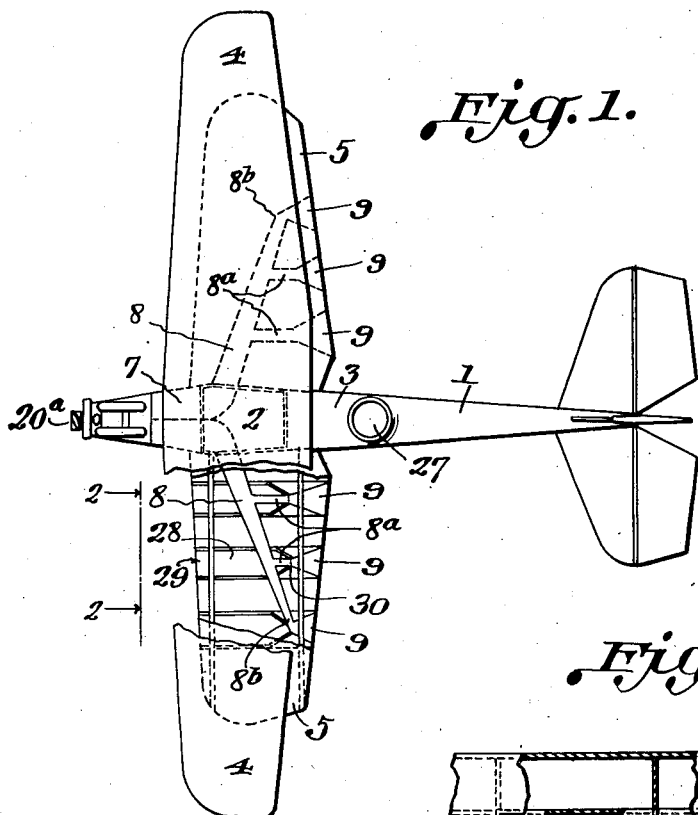
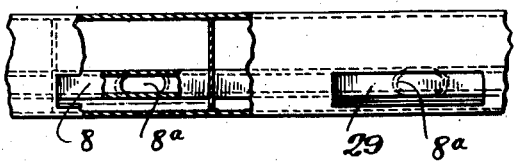
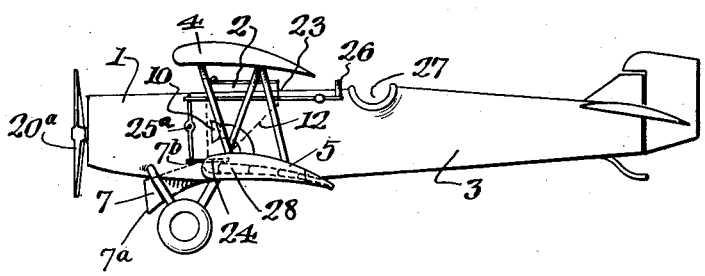
Inventor
Elmer Johnson
Attorney April 13, 1926.  
E. JOHNSON  
AIRPLANE POWDER DUSTING APPARATUS  
Filed Feb. 4, 1926

1,580,301

Inventor  
Elmer Johnson  
Attorney

April 13, 1926.
E. JOHNSON
1,580,301
AIRPLANE POWDER DUSTING APPARATUS
Filed Feb. 4, 1926   3 Sheets-Sheet 3
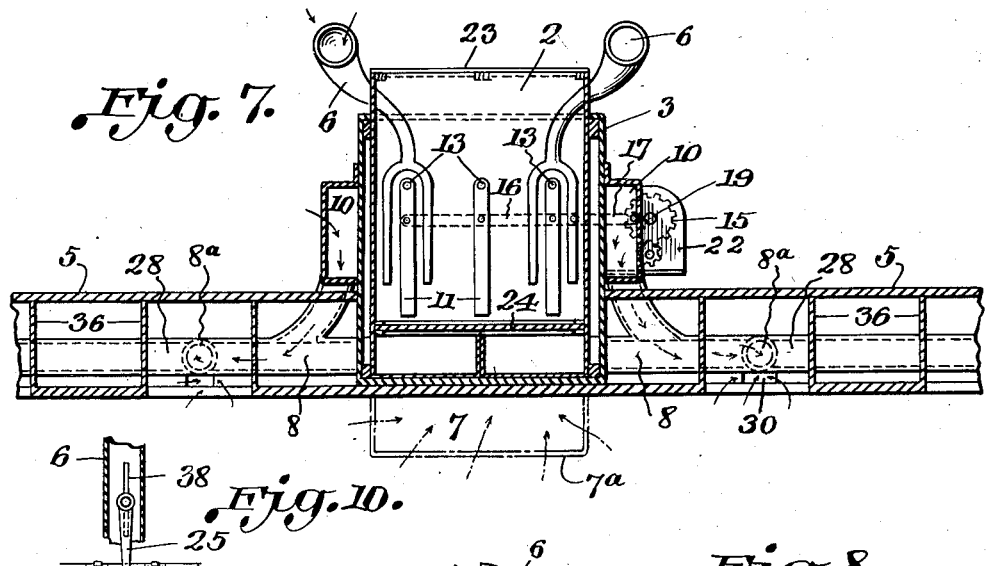
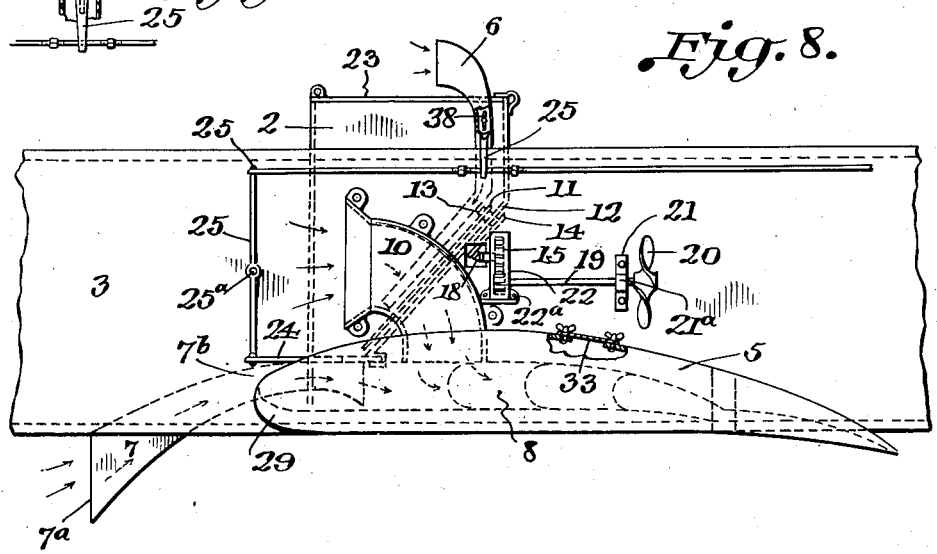
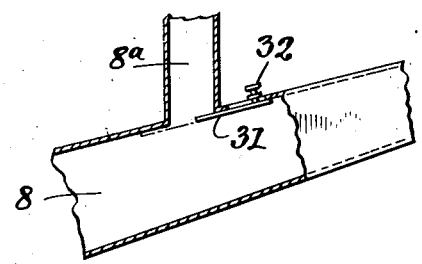
Inventor
Elmer Johnson
By R. W. Williams, C. W. Boyle, P. D. Cronin and A. J. Decker
Attorney Patented Apr. 13, 1926.

1,580,301

UNITED STATES PATENT OFFICE.

ELMER JOHNSON, OF WASHINGTON, DISTRICT OF COLUMBIA, DEDICATED TO THE GOVERNMENT AND THE PEOPLE OF THE UNITED STATES.

AIRPLANE POWDER-DUSTING APPARATUS.

Application filed February 4, 1926. Serial No. 86,084.

(GRANTED UNDER THE ACT OF MARCH 3, 1883; 22 STAT. L. 625.)

*To all whom it may concern:*

Be it known that I, ELMER JOHNSON, a citizen of the United States of America, and an employee of the United States Department of Agriculture, residing at Washington, District of Columbia, have invented certain new and useful Improvements in Airplane Powder-Dusting Apparatus, of which the following is a specification.

This application is made under the act of March 3, 1883, chapter 143 (22 Stat. 625) and the invention herein described and claimed may be used by the Government of the United States, or any of its officers and employees in the prosecution of work for the Government or by any other person in the United States, without payment to me of any royalty thereon.

The principal object of the invention is to provide efficient means for scattering or distributing granular material from an airplane, and more particularly the distribution of insecticidal and fungicidal material, fertilizers, etc., over land or water.

A further object is to provide apparatus adapted for the purposes above described that may be operated and controlled by the pilot while the airplane is in flight and so positioned in the airplane as not to interfere with the stability thereof.

A further object of the invention is to overcome certain difficulties that have heretofore been encountered in distributing for instance insecticide powder from an airplane, consisting in the impracticability of delivering a large volume of the powder into the air without having lumps of powder forming and thus falling to the earth. By the use of my present apparatus, it is possible to discharge granular material from the airplane in thin streams in such a way that the particles are prevented from coming into contact with each other to form lumps, thereby enabling the uniform deposit of the material on the territory desired to be treated with the granular material.

On the drawings:

Figure 1 is a plan view of the entire airplane with certain parts broken away.

Fig. 2 is a front sectional view of a part of the lower wing of the airplane showing entrance ports for air scoops in the wing.

Fig. 3 is a side elevation of the airplane.

Fig. 7 is a sectional view along the line 7—7 of Fig. 4.

Fig. 8 is an elevation at the end of the lower wing showing the hopper and the system of air scoops.

Fig. 9 is a detail of the hand valve for regulating entrance from main duct to distributing duct for granular material.

Fig. 10 is a detail view of the butterfly valve in air scoops at the upper part of the hopper.

Figure 4:
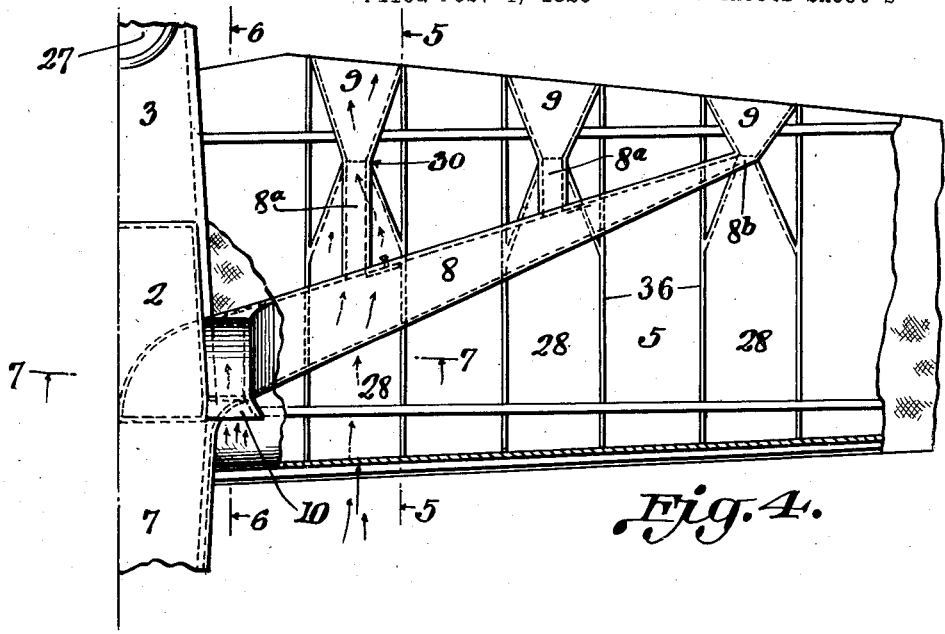
Fig. 4 is a plan view of a part of a lower wing member and the fuselage, showing the scheme of air ducts.

Referring to the drawings, it will be seen that my apparatus comprises an airplane 1, equipped with a hopper 2, located on approximately the center of gravity in the fuselage 3 of the airplane, preferably between the upper 4 and lower 5 wing structures, air scoops 6 at the upper part of and communicating with the hopper, air scoop 7 at the lower part of the hopper and communicating therewith, and having a discharge outlet leading to ducts 8, which in turn lead through pipes 8ª to nozzles 9 located on the rear edge of the lower wing. Supplemental air scoops 10 are provided adjacent the hopper and communicating with ducts 8 to give added impulse to the current of powder laden air passing therethrough. The hopper is provided with means for agitating the material contained therein, comprising a set of swinging levers 11 inside and operating close to the sloping wall 12 of the hopper and hinged by pins 13 to a set of rocking levers 14 outside the wall 12, said levers 14 being connected to reduction gears 15 by bar 16 to give each bar of the swinging levers 11 the same throw, bar 16 being adjustable upwardly and downwardly on levers 14 to control the length of throw of the tips of levers 11. A connecting rod 17 joined to bar 16 by ball joint 18 is driven by reduction gears 15 through shaft 19 on which is propeller 20 located either at the rear of the hopper as shown in the drawing, or in any other suitable place and manner to rotate when the airplane is in flight.

This propeller is rotated by the current of air produced by the movement of the airplane propeller 20ª and the forward movement of the airplane. Bracket support 21 carries a bearing 21ª for shaft 19. Housing 22 for reduction gears 15 is supported by means of suitable braces 22ª fastened to the fuselage 3. The hopper is also provided with a lid 23 and a gate or valve 24 at the bottom adapted to be opened and closed, partially or entirely, at will by a system of levers 25 with fulcrum as at 25ª and equipped with a handle 26 adjacent to or inside the pilot's cockpit 27. Butterfly valves 38 are provided in air scoops 6 and are opened and closed by the aforesaid system of levers 25 synchronously with the hopper valve 24.

Air scoop 7 has a wide mouth 7ª located beneath the fuselage 3 and in front of the hopper 2, a throat or restricted portion 7ᵇ extending through the bottom section of the fuselage, and having an opening communicating with the hopper outlet and adapted to receive material discharge from the hopper. This scoop 7 divides immediately at the rear of the hopper outlet into two sections leading to ducts 8, located between the upper and lower surfaces of the lower wing members 5.

The ducts 8 lead from the throat of air scoops 7 at a point adjacent the front edge of the lower wing members 5, in a diagonal direction toward the rear of these wings and are provided with pipe outlets 8ª communicating with flared nozzles 9 on air scoops 28. The ducts 8 are tapered in the direction of their terminals 8ᵇ. Air scoops 28 have a Venturi action, and are located inside the bottom of and extend practically the entire width of the lower wing members 5, having mouths 29, throats 30 and flared nozzles 9.

Ducts 8 are provided with adjustable slides 31 adapted to regulate from complete closure of certain of the pipes 8ª to any desired opening, the volume of powder laden air flowing into pipes 8ª. These slides 31 are equipped with thumb nuts 32 adapted to hold the slides in desired position. Access to slides 31 is gained by hand hole in the wing covered by removable plate 33, suitably bolted to the wing.

Suitable supports (not shown) may be provided for ducts 8 and 8ª on the airplane ribs 36. If necessary some of these ribs may be moved or removed if they interfere with the installation of the ducts.

All of the parts above described as appearing in the lower wing members 5, may be constructed of metal, wood, or fabric, or combinations thereof.

In the operation of my invention, when the airplane is in flight over areas intended to be treated with the granular material contained in the hopper, the hopper valve 24 and the valve 38 in scoops 6 are opened simultaneously by the operator from cockpit 27 by moving handle 26 of the system of levers 25, thereby permitting the material to flow through the exit opening in the bottom of the hopper, impulse to such movement of the material being given by the current of air delivered through scoops 6 and also by the oscillating movement of agitator arms 11 operating along the sloping wall 12 of the hopper. As the material passes from the hopper, it is delivered into an opening in the throat 7ᵇ of air scoop 7 and is carried along with the current of air coming into the mouth 7ª of this scoop to the ducts 8 extending from points adjacent the hopper in a lateral direction toward the ends of the lower wing members 5 of the airplane. Added impulse is given to this movement by the current of air brought into scoops 10 mounted on the sides of the fuselage and conveyed to ducts 8. The material laden air passing along ducts 8 discharges into pipes 8ª in volumes controlled by adjustable gates 31, when it passes to flared nozzles 9 at the rear of the lower wings 5 and is discharged in thin streams into the atmosphere. To assist and give added implulse to the discharge of these streams of air-granular material, air is conducted through scoops 28 and delivered to the streams of material laden air issuing from pipes 8ᵇ. The velocity of the air passing through scoops 28 is increased at the points of communication with pipes 8ª by means of the constricted portion or throat 30 of scoops 28. The velocity of the air passing through scoops 28 is greater than the velocity of the material laden air issuing from tubes 8ª, and therefore further tends to prevent the formation of lumps of the granular material as it is distributed from the airplane.

Air scoops 6, 7 and 10 are adapted to receive currents of air generated by the airplane propeller and also resulting from the forward movement of the airplane.

It is obvious from the foregoing that the granular material laden air is discharged at the rear of the lower wing members and at a plurality of points extending practically the entire length of such wing members.

Figure 5:
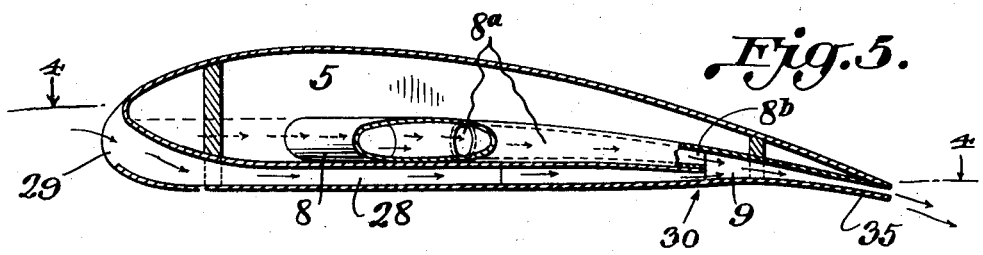
Fig. 5 is a section along the line 5—5, of Fig. 4.

The discharge opening of nozzles 9 may be at the bottom side of the rear edge of the wing 5 as shown in the drawings, or if desired the outlet may be on the top side of the wing, or elsewhere, or if desired the lower edge 35 of nozzles 9 may be extended to the rear edge of the wing (Fig. 5).

Figure 6:
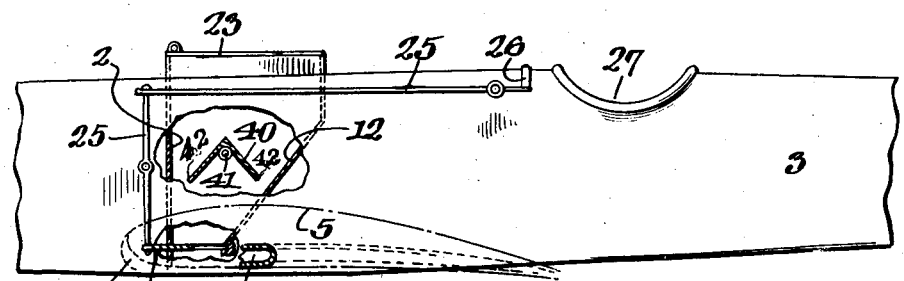
Fig. 6 is an elevation partly in section showing gate valve and control levers.

A modification of the hopper 2 (as shown in Fig. 6) comprises an inverted V-shaped member 40 pivoted at 41, adapted to support that portion of the granular material in the hopper above such member, the function of which is to prevent undue or excessive packing of the granular material in the bottom of the hopper which might interfere with the operation of the agitating means and result in the stoppage of the discharge of the granular material from the hopper outlet. The outer edges 42 of this V-shaped member extend to a point adjacent the walls of the hopper and as near the bottom of the hopper as may be desired so long as sufficient space remains for the proper swing of the outer edges 42 from one side to the other of the hopper. This member may extend the full width of the hopper if desired.

I claim:

In an airplane, a dusting hopper having an exit opening therein, means for causing the agitation of the granular material contained in said hopper, means located at the upper part of the hopper for passing currents of air therethrough, means under said hopper for conveying a blast of air to scatter the material passing from said hopper, said means under the hopper being in line with the airplane propeller, pipe means communicating with the aforesaid means under the hopper for conveying said granular material and the air mixed therewith in lateral directions toward the extremities of the lower wing structures of the airplane, means adjacent the hopper and at the rear thereof for supplying a supplemental blast to the aforesaid pipe means, said pipe means carried within the lower wing structures, a plurality of pipes within the lower wing structures communicating at designated points with said pipe means so as to permit of the passage therethrough of said granular material and the air mixed therewith, a plurality of Venturi shaped tubes located in the lower wing structures, corresponding to the number of and communicating, at the throats of said Venturi shaped tubes with the aforesaid plurality of pipes said Venturi shaped tubes having mouths for the entrance of air, a throat and flared exit openings at the rear of the lower wings for the discharge, into the atmosphere, of the granular material and air emerging from the throats of the Venturi shaped tubes.

ELMER JOHNSON.